United States Patent
Zeng et al.

(10) Patent No.: US 10,505,232 B2
(45) Date of Patent: Dec. 10, 2019

(54) STACKED, ROLLED-ELECTRODE BATTERY CELL WITH Y-AXIS BENDING

(71) Applicant: Microsoft Technology Licensing, LLC, Redmond, WA (US)

(72) Inventors: Dongli Zeng, Fremont, CA (US); Vijayasekaran Boovaragavan, Cupertino, CA (US); John Christopher Collins, San Jose, CA (US); Tzu-Yuan Lin, San Jose, CA (US); Michael Nikkhoo, Saratoga, CA (US)

(73) Assignee: Microsoft Licensing Technology, LLC, Redmond, WA (US)

( * ) Notice: Subject to any disclaimer, the term of this patent is extended or adjusted under 35 U.S.C. 154(b) by 245 days.

(21) Appl. No.: 15/396,314

(22) Filed: Dec. 30, 2016

(65) Prior Publication Data
US 2018/0191034 A1    Jul. 5, 2018

(51) Int. Cl.
| | |
|---|---|
| *H01M 10/0587* | (2010.01) |
| *H01M 10/0525* | (2010.01) |
| *H01M 2/02* | (2006.01) |
| *H01M 2/10* | (2006.01) |
| *H01M 10/04* | (2006.01) |
| *H01M 10/052* | (2010.01) |

(52) U.S. Cl.
CPC ..... *H01M 10/0587* (2013.01); *H01M 2/0212* (2013.01); *H01M 2/1027* (2013.01); *H01M 10/0431* (2013.01); *H01M 10/052* (2013.01); *H01M 10/0525* (2013.01); *H01M 2/0275* (2013.01)

(58) Field of Classification Search
CPC ........... H01M 10/0431; H01M 10/052; H01M 10/0525; H01M 10/0587; H01M 2/0212; H01M 2/0275; H01M 2/1027
See application file for complete search history.

(56) References Cited

U.S. PATENT DOCUMENTS

| | | | |
|---|---|---|---|
| 2003/0108787 A1* | 6/2003 | Endo | H01B 1/122 |
| | | | 429/94 |
| 2012/0183825 A1 | 7/2012 | Lee et al. | |
| 2013/0136967 A1 | 5/2013 | Bhardwaj et al. | |

(Continued)

FOREIGN PATENT DOCUMENTS

| | | |
|---|---|---|
| EP | 2846379 A1 | 3/2015 |
| WO | 2015016463 A1 | 2/2015 |
| WO | 2015016465 A1 | 2/2015 |

OTHER PUBLICATIONS

"International Search Report and Written Opinion Issued in PCT Application No. PCT/US2017/068058", dated Feb. 26, 2018, 11 Pages.

(Continued)

*Primary Examiner* — Lingwen R Zeng
(74) *Attorney, Agent, or Firm* — Arent Fox LLP

(57) ABSTRACT

A rolled-electrode battery cell includes multiple, stacked electrode rolls that are stacked along a stacking axis. Each of the electrode rolls has its electrode tabs bonded to an end of the electrodes, so that the electrode tabs extend from the ends of the electrodes along the winding direction of the electrodes. The stacked electrode rolls are bent around respective bending axes that are parallel to their winding axes, and perpendicular to the stacking axis and the winding direction of the electrodes.

8 Claims, 5 Drawing Sheets

(56) References Cited

U.S. PATENT DOCUMENTS

| | | |
|---|---|---|
| 2014/0050958 A1 | 2/2014 | Kwon et al. |
| 2014/0090236 A1 | 4/2014 | Goh et al. |
| 2014/0120397 A1 | 5/2014 | Kim et al. |
| 2015/0104681 A1 | 4/2015 | Wang et al. |
| 2015/0340662 A1 | 11/2015 | Kwon et al. |
| 2015/0340729 A1 | 11/2015 | Ko et al. |
| 2015/0372337 A1* | 12/2015 | Kim .................. H01M 2/0212 429/94 |

OTHER PUBLICATIONS

"Wearable Device", Published on: Mar. 26, 2016 Available at: http://www.samsungsdi.com/lithium-ion-battery/it-devices/wearable-device.html.

"Curved Lithium Polymer Batteries from PowerStream", Published on: Apr. 4, 2016 Available at: http://www.powerstream.com/curved-lithium-polymer.htm.

"Curved and Ultra Thin Cells", Retrieved on: May 26, 2016, Available at: http://www.jauch.de/cms/en/news/curvedultrathinlithiumpolymercells/.

"Ultra curved battery", Published on: Jan. 20, 2015, Available at: http://www.pdbattery.com/ultra-curved-battery.html.

Bhardwaj, et al., "Apple's research into curved battery technology points to new iOS products designs", Published on: May 2, 2013, Available at: http://forums.appleinsider.com/discussion/157320/apples-research-into-curved-battery-technology-points-to-new-ios-products-designs.

\* cited by examiner

STACKED, ROLLED-ELECTRODE BATTERY CELL WITH Y-AXIS BENDING

BACKGROUND

One technique used in the design and manufacture of certain types of battery cells, such as rechargeable lithium-ion ("Li-ion") cells, is the so-called "jelly roll" technique. This technique involves winding two thin, flat metal sheets that form the anode and cathode electrodes of the battery cell, respectively, around a spindle or mandrel, with a thin, flat insulative layer between them, to form an electrode roll. A conductive terminal is bonded (e.g., welded) to each electrode to provide an external terminal of the battery cell. The electrode roll is often pressed into a flatter shape before enclosing it in a casing.

For some applications, it is desirable to have a battery cell that is curved or bent in a specified direction, to meet space constraints and/or to make the battery cell better conform to the form factor of the end product in which it will be used. In such cases the electrode roll or the entire assembled cell is pressed around a cylindrical tool to form it into a curved shape. In some applications, it is desirable to have a thicker battery cell, to provide certain desired electrical performance characteristics. However, a requirement for a curved battery cell may impose limits on how thick the electrode roll (and hence the cell) can be made, due to limitations of existing manufacturing equipment and/or the materials of the electrodes.

SUMMARY

The technique introduced here enables construction of a curved jelly roll type battery cell that is thicker than conventional curved jelly roll type battery cells, and that can be constructed using conventional manufacturing equipment. In at least some embodiments, a rolled-electrode battery cell according to this technique includes multiple, stacked electrode rolls that are stacked along a stacking axis. Each of the electrode rolls has its electrode tabs bonded to an end of the electrodes (rather than to, e.g., a lengthwise edge of the electrodes), so that the electrode tabs extend from the ends of the electrodes along the winding direction of the electrodes. The stacked electrode rolls are bent around respective bending axes that are parallel to their winding axes, and perpendicular to the stacking axis and the winding direction of the electrodes.

Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Figure 1:
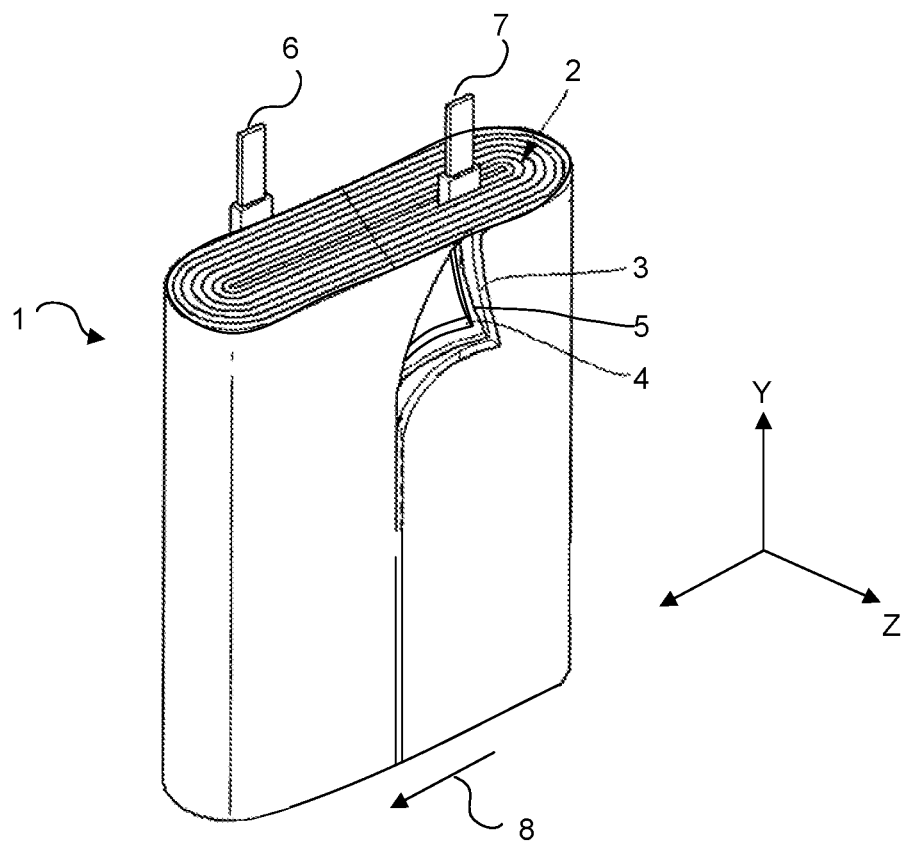
FIG. 1 illustrates an example of an electrode roll for use in a jelly roll type battery cell, according to a first design approach.

FIG. 1 shows an example of an electrode roll for use in a jelly roll type battery cell 1, according to one design approach. The battery cell 1 includes an electrode roll 2, which includes an anode 3 and cathode 4 separated by an insulative layer 5, each formed from flat sheets that have been rolled together to form the electrode roll 2. An electrode tab 6 is coupled to the anode 3, while another electrode tab 7 is coupled to the cathode 4, extending from different locations along lengthwise edge of the electrodes 3, 4. As can be seen, the electrode tabs 6, 7 extend from the electrodes 3, 4 in a direction that is perpendicular to the winding direction 8 of the electrode roll 2. The winding direction is always perpendicular to the winding axis.

Figure 2:
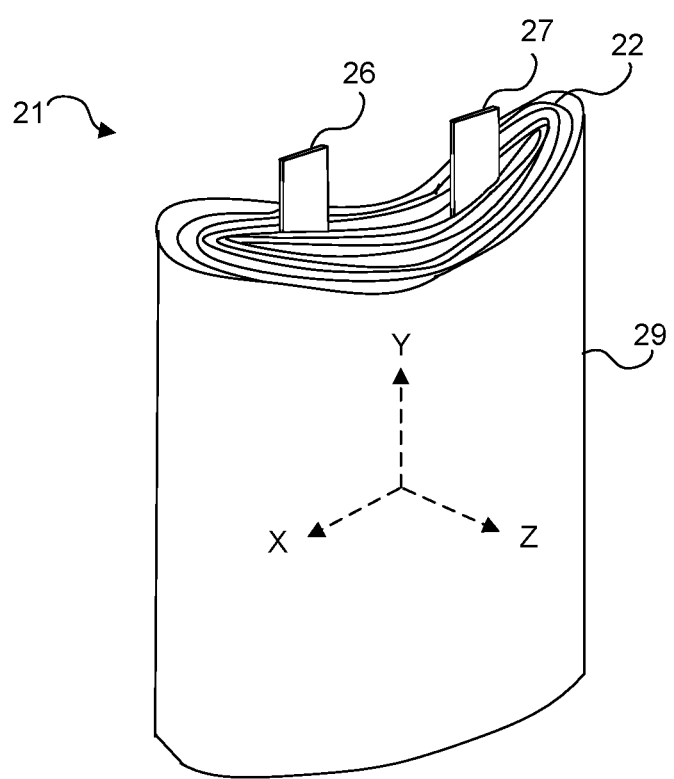
FIG. 2 shows a perspective view of a curved, jelly roll type battery cell with x-axis bending.

For certain applications it may be desirable for a jelly roll type battery cell to have a curved form factor. FIG. 2 illustrates an example of a jelly roll type battery cell similar to the illustrated in FIG. 1, but with a curved form factor. During manufacturing of the battery cell 21, the electrode roll 22 is pressed against a hard curved surface (not shown) to apply a curvature (bend) to the electrode roll, either before or after the electrode roll 22 is enclosed in an outer protective wrapper 29. Electrode tabs 26 and 27 are bonded to and extend from the electrodes in a direction perpendicular to the winding direction of the electrodes, as described above.

FIGS. 1 and 2 also show orthogonal x-, y- and z-axes. The y-axis is parallel to the longest dimension of the electrode roll (not the individual electrodes when in their pre-rolled state), which is also the direction in which the electrode tabs extend before any bending/curvature has been applied to the electrode roll. In the embodiments of FIGS. 1 and 2, the y-axis is also either the winding axis of the electrode roll or parallel to the winding axis of the electrode roll. The z-axis is parallel to the thickness of the electrode roll through its geometric center. The x-axis is perpendicular to the y- and z-axes. The curved cell approach illustrated in FIG. 2 is referred to herein as an "x-axis bending" or simply "x-bending" approach, because the bending/curvature is applied to the electrode roll along the x-axis (i.e., about the y-axis or an axis parallel to the y-axis).

The design approach illustrated in FIG. 2, however, imposes constraints on how thick the battery cell can be made. For some applications, it may be desirable to have a thicker curved jelly roll type cell than that which could be achieved (or achieved within certain cost parameters) using the approach of FIG. 2. The technique introduced here, therefore, addresses this problem and is illustrated in FIGS. 3 through 6.

Figure 3:
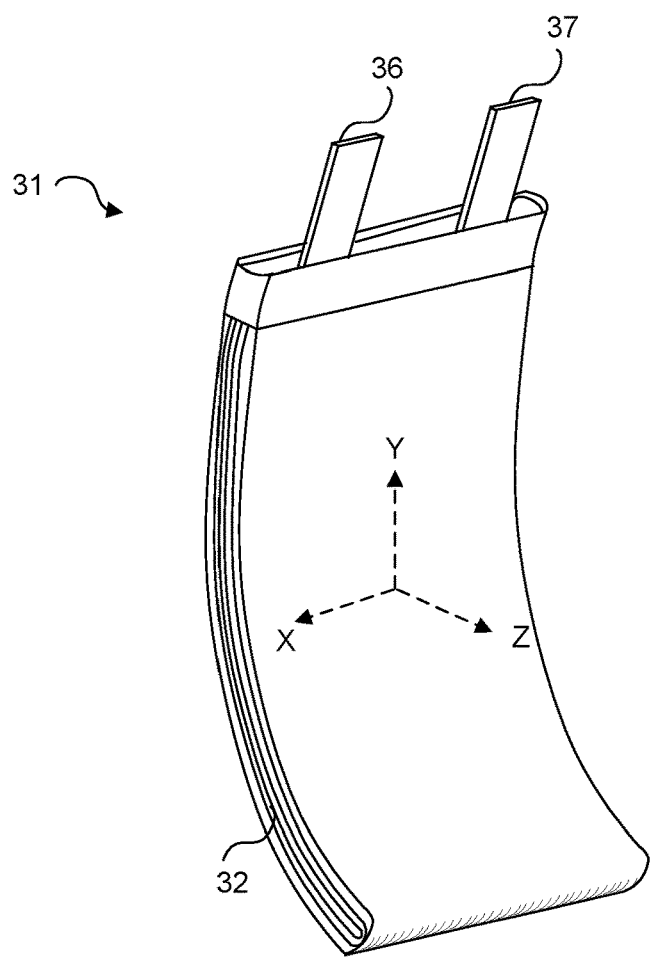
FIG. 3 shows a perspective view of a curved, jelly roll type battery cell with y-axis bending according to a first embodiment.
Figure 4:
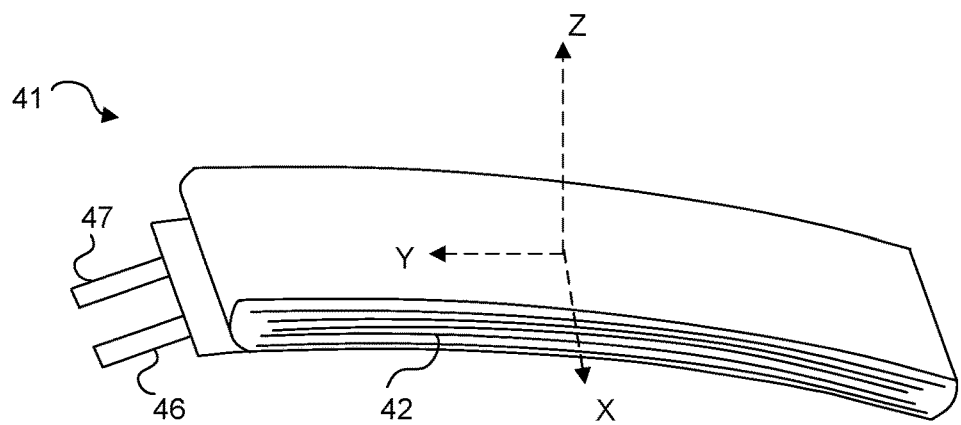
FIG. 4 shows a perspective view of a curved, jelly roll type battery cell with "y-axis bending" according to a second embodiment.

FIGS. 3 and 4 show perspective views of two embodiments of a curved, jelly roll type battery cell 31 or 41 with so-called "y-axis bending" or simply "y-bending." It is so named because, in contrast with the embodiment of FIG. 2, the bending/curvature is applied to the electrode roll 32 or 42 along the y-axis (i.e., about the x-axis or an axis parallel to the x-axis). Additionally, in contrast with the embodiment of FIG. 2, the electrode tabs 36 and 37, or 46 and 47, extend from the ends of their respective electrode sheets along the winding direction of the electrode roll, rather than perpendicular to the winding direction. In the embodiments of FIGS. 3 and 4, the winding axis of the electrode roll 32 or 42 is the x-axis or an axis parallel to the x-axis; further, the battery cell 31 or 41 (and each electrode roll contained in it) is bent about an axis (the "bending axis") that is not parallel to the axis/direction along which the electrode tabs 36 and 37, or 46 and 47, extend from the electrodes. An enclosure (not shown), such as a laminated aluminum foil wrapper, may enclose the electrode roll 32 or 42. Note that while FIGS. 3 and 4 show the tabs 36/37 and 46/47 positioned closer to the inner curved surfaces 38 and 48, respectively, the tabs could instead be positioned closer to the outer curved surfaces 39 and 49.

Figure 5A:
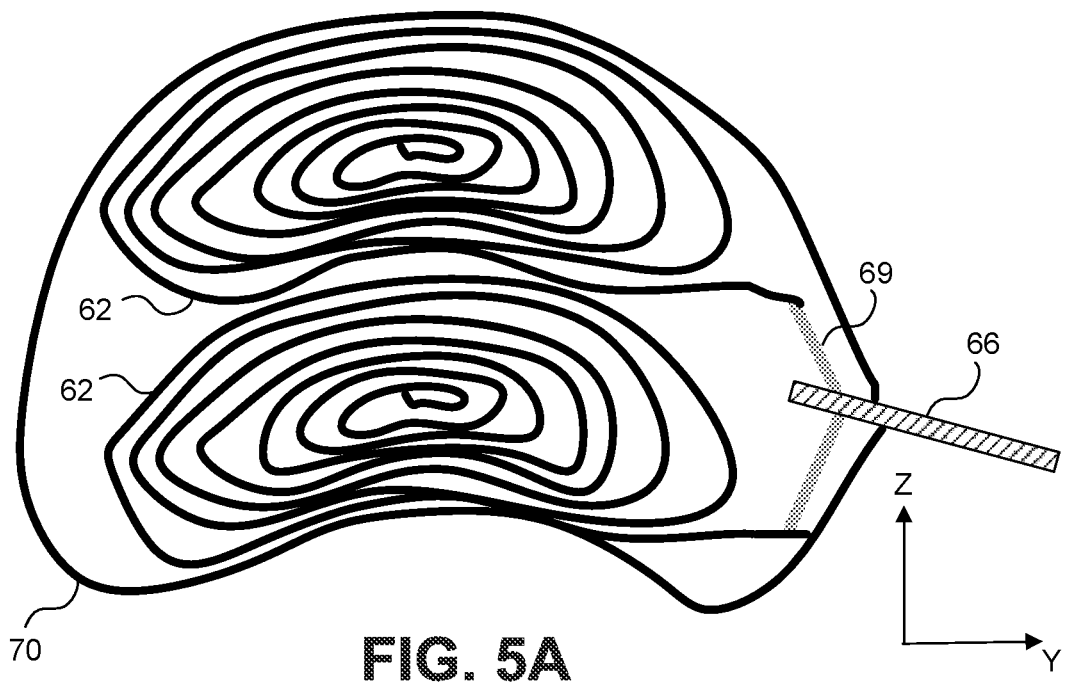
FIG. 5A shows a schematic cross-sectional view of a battery cell with multiple stacked electrode rolls and with y-bending, where the electrode rolls have the same winding direction.
Figure 5B:
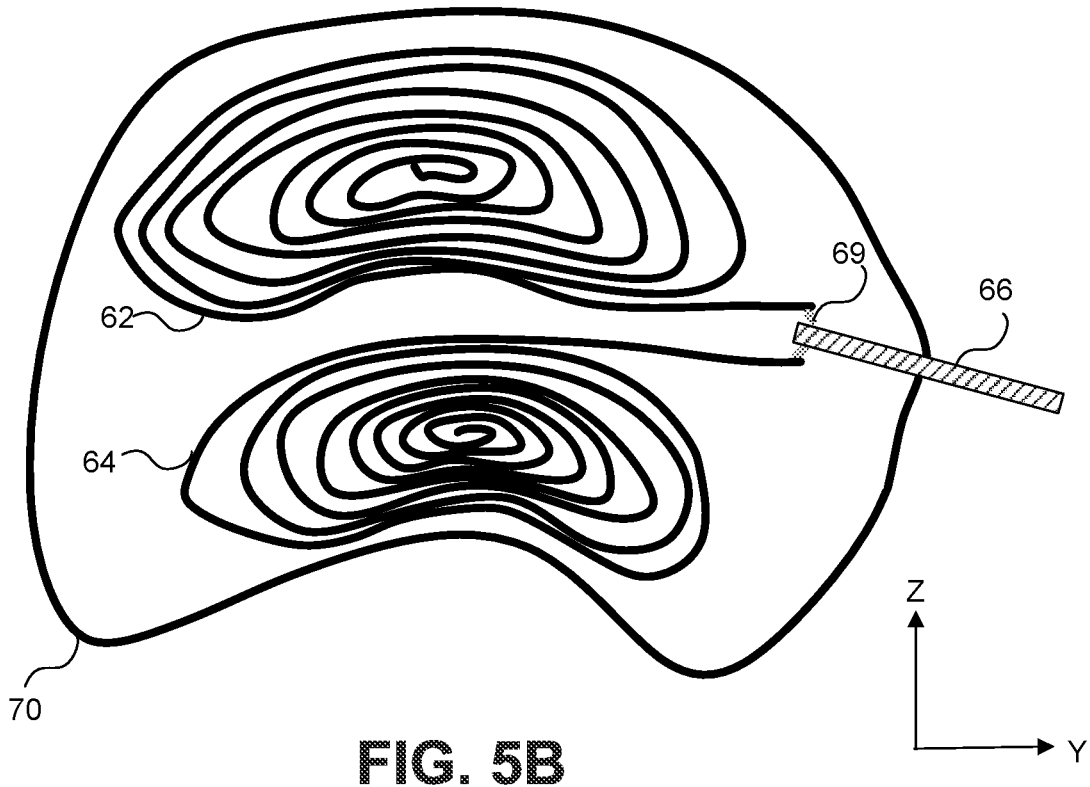
FIG. 5B shows a schematic cross-sectional view of a battery cell with multiple stacked electrode rolls and with y-bending, where the electrode rolls have opposite winding directions.

An advantage of applying the bending along the y-axis, rather than along the x-axis, is that it allows two or more electrode rolls to be stacked on top of one another and coupled together, to effectively produce a thicker cell, as illustrated in FIGS. 5A and 5B. Furthermore, it allows a thicker curved cell to be produced using an existing electrode winding machine. However, Y-bending jelly-roll type cells with tabs bonded to the ends of the electrodes as described above may require a piece-by-piece manufacturing process to be used, such as described below, which different from the continuous winding process that a conventional electrode winding machine uses. Electrode winding machines used to produce y-bending type cells often have limitations on the length of the electrodes, e.g., a maximum of 500 mm.

FIGS. 5A and 5B show, as schematic cross-sectional views, two embodiments of a cell with stacked electrode rolls and y-bending. Note that while the individual electrode layers of each electrode roll are not illustrated in FIGS. 5A and 5B, each electrode roll 62 or 64 includes an anode layer, a cathode layer and an insulative separator between the anode and cathode layers. Similarly, while only a single electrode tab 66 is illustrated in these figures, it should be understood that a separate electrode tab is provided for the anode and for the cathode. The electrodes with the same plurality in each electrode roll are coupled together, as shown in the FIGS. 5A and 5B (i.e., anode-to-anode and cathode-to-cathode). More specifically, each of the electrodes in each electrode roll is bonded to a corresponding electrode tab 66 by welds 69 or other suitable bonding technique. This approach effectively results in a single thicker (double-thickness) anode and a single thicker (double-thickness) cathode, and therefore, a thicker overall cell. Bending can be applied to the electrode rolls either individually, before they are enclosed in the wrapper 70, or it can be applied to the cell as a whole after the electrode rolls are enclosed in a wrapper. Three or more electrode rolls can be stacked in similar manner to achieve an even thicker cell. The wrapper 70 can be, for example, laminated aluminum foil.

In the embodiment of FIG. 5A, the electrode rolls 62 are positioned within the cell with their winding directions in the same direction. FIG. 5B, on the other hand, shows an embodiment in which the electrode rolls 62, 64 are positioned within the cell with their winding directions opposite to each other. This approach may allow the ends of the electrodes to be placed closer together in the z-direction, as shown, which may make it easier to bond the like-polarized electrodes in different electrode rolls to one electrode tab. Note also that it is possible to use electrode rolls of different sizes within the same wrapper, which may provide additional flexibility in achieving various different form factors for the battery cell.

Figure 6:
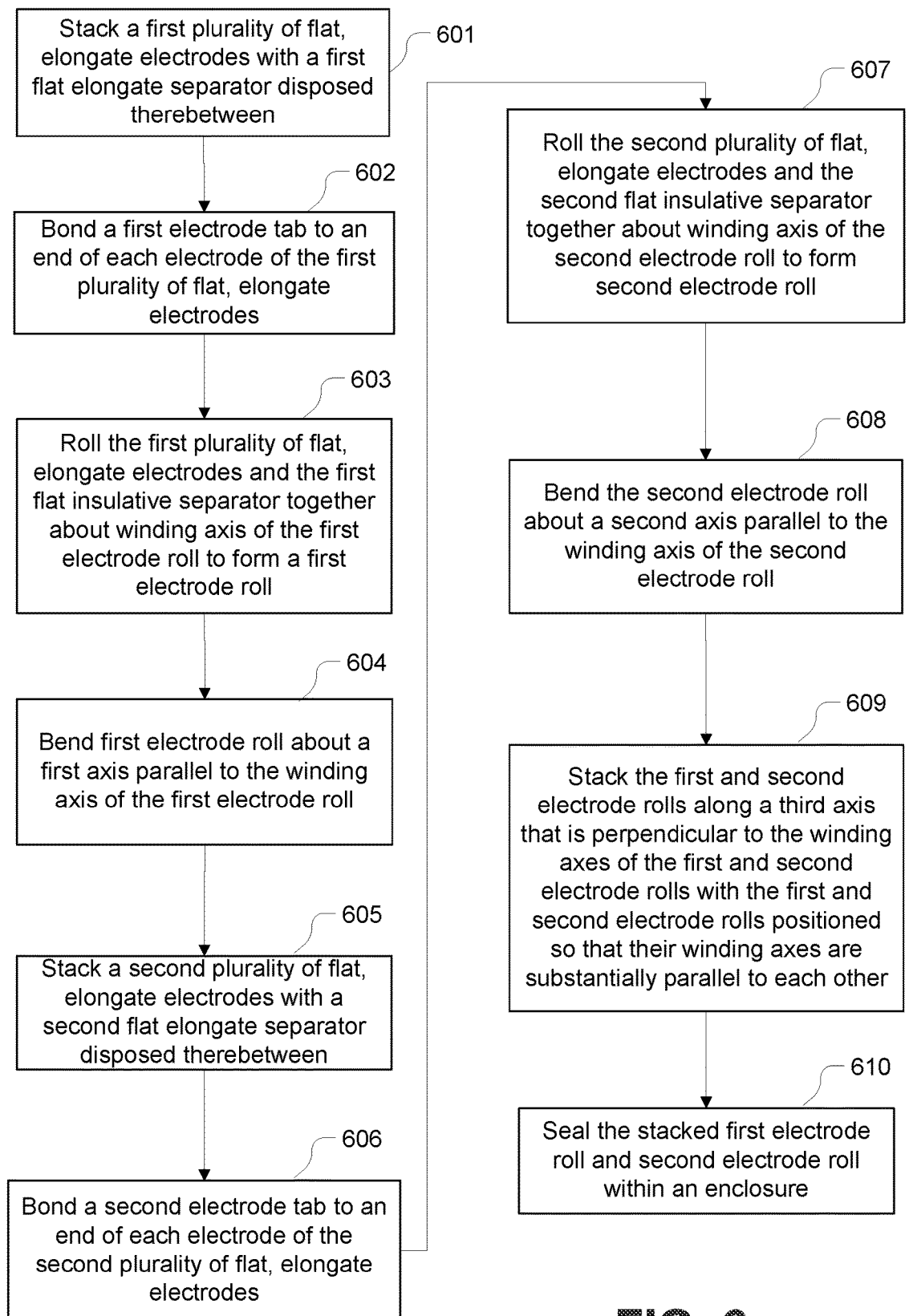
FIG. 6 illustrates an example of a process of manufacturing a y-bending, curved, jelly roll type battery cell including multiple stacked electrodes.

FIG. 6 illustrates an example of a process of manufacturing a y-bending, curved, jelly roll type battery cell such as described above. The process begins at step 601, in which a first electrode tab is bonded to an end of each electrode of a first plurality of flat, elongate electrodes, extending from the electrode parallel to the length (longest dimension) of the electrode, i.e., along what will become the winding direction of the electrode. Next, at step 602 the first plurality of flat, elongate electrodes are stacked on each other with a first flat elongate separator disposed between them. At step 603, the first plurality of flat, elongate electrodes and the first flat insulative separator are rolled (wound) together about a winding axis of the first electrode roll, with the first electrode tabs bonded to the first plurality of flat, elongate electrodes, to form a first electrode roll. At step 604, the first electrode roll is bent about a first bending axis parallel to the winding axis of the first electrode roll. Alternatively, the bending can be performed on all the electrode rolls collectively after they have been stacked together, as mentioned above and described further below.

At step 605 a second electrode tab is bonded to an end of each electrode of a second plurality of flat, elongate electrodes, extending from the electrode parallel to the length (longest dimension) of the electrode, i.e., along what will become the winding direction of the electrode. At step 606 the second plurality of flat, elongate electrodes are stacked on each other with a second flat elongate separator disposed between them. At step 607 the second plurality of flat, elongate electrodes and the second flat insulative separator are rolled (wound) together about a winding axis of the second electrode roll, with the second electrode tabs bonded to the second plurality of flat, elongate electrodes, to form a second electrode roll. At step 608, the second electrode roll is bent about a second bending axis parallel to the winding axis of the second electrode roll. Alternatively, the bending can be performed on all the electrode rolls collectively after they have been stacked together, as mentioned above and described further below.

Next, at step 609 the first and second electrode rolls are stacked along a stacking axis that is perpendicular to the winding axes of the first and second electrode rolls, with the first and second electrode rolls positioned so that their winding axes are substantially parallel to each other. As described above, their winding directions may be the same direction or opposite to each other when they are positioned in the stack. Note that in some embodiments, additional electrode rolls can be stacked with the first and second electrodes. Additionally, two or more of the individual electrode rolls can be of different sizes and/or shapes. However, the electrode tabs extending along the winding direction should be aligned (i.e., positive with positive, negative with negative) to allow formation of a single stake (terminal) of positive electrode and a single stake of negative electrode. Finally, at step 610 the stacked first and second electrode rolls (and optionally, one or more additional electrode rolls) are sealed within an enclosure, such as a laminated aluminum foil wrapper, with the electrode tabs or extensions of the electrode tabs protruding from the enclosure to provide external connection terminal of the battery cell.

Note that not all of the above-described steps are necessarily performed in the order described above. For example, steps 605 through 608 could be performed in parallel with steps 601 through 604. Further, other embodiments may include additional steps not described above and/or may omit some of the above-described steps.

Examples of Certain Embodiments

Certain embodiments of the technology introduced herein are summarized in the following numbered examples:

1. A battery cell comprising: a plurality of electrode rolls, each including a rolled pair of electrodes of opposite polarity, the electrode rolls being stacked within the battery cell along a stacking axis, each of the electrode rolls having a separate winding axis around which the electrodes of the electrode roll have been wound, each said winding axis being perpendicular to the stacking axis, each of the electrodes in each of the electrode rolls having been formed from a flat conductive sheet having a plurality of edges that define a length of the electrode and a plurality of ends that define a width of the electrode perpendicular to the edges; a plurality of electrode tabs, each coupled to and extending from one of the ends of a corresponding one of the electrodes along a winding direction of said corresponding one of the electrodes; and an enclosure containing the plurality of electrode rolls; wherein the battery cell is bent about a bending axis that is not parallel to an axis along which the electrode tabs extend from the electrodes.

2. A battery cell as recited in example 1, wherein each of electrode tabs extends from a corresponding electrode roll in a direction that is substantially perpendicular to both the winding axis of the electrode roll and the stacking axis.

3. A battery cell as recited in example 1 or example 2, wherein each of the plurality of electrode rolls is bent about a separate one of a plurality of bending axes that are not parallel to the axis along which the electrode tabs extend from the electrodes.

4. A battery cell as recited in any of examples 1 through 3, wherein the battery cell is a lithium-ion cell.

5. A battery cell as recited in example any of examples 1 through 4, wherein the plurality of electrode rolls, as positioned within the battery cell, are wound in the same direction about their respective winding axes.

6. A battery cell as recited in any of examples 1 through 4, wherein the plurality of electrode rolls, as positioned within the battery cell, are wound in opposite directions about their respective winding axes.

7. A battery cell as recited in any of examples 1 through 6, wherein at least two of the plurality of electrode rolls are of different sizes in at least one dimension.

8. A battery cell as recited in any of examples 1 through 7, wherein at least two of the plurality of electrode rolls are of different shapes.

9. A bent, rolled-electrode battery cell comprising: a plurality of electrode rolls, each including a pair of electrodes of opposite polarity rolled together with an insulative flat separator disposed therebetween, the plurality of electrode rolls being stacked within the battery cell along a stacking axis, each of the plurality of electrode rolls having been rolled about a separate respective winding axis perpendicular to the stacking axis, each of the plurality of electrode rolls being bent about a separate respective bending axis parallel to the winding axis of the electrode roll and perpendicular to the stacking axis, each of the electrode rolls formed from a flat elongate sheet that has a plurality of edges that define a length of the electrode and a plurality of ends that define a width of the electrode perpendicular to the edges; a wrapper containing the plurality of electrode rolls; and a plurality of electrode tabs, each coupled to and extending from one of the ends of a corresponding one of the electrodes in each of the plurality of electrode rolls along a winding direction of the electrode roll, and each coupled to a corresponding external connection terminal of the battery cell.

10. A bent, rolled-electrode battery cell as recited in example 9, wherein the bent, rolled-electrode battery cell is a lithium-ion cell.

11. A bent, rolled-electrode battery cell as recited in example 9 or example 10, wherein the plurality of electrode rolls, as positioned within the wrapper, are wound in the same direction about their respective winding axes.

12. A bent, rolled-electrode battery cell as recited in example 9 or example 10, wherein the plurality of electrode rolls, as positioned within the wrapper, are wound in opposite directions about their respective winding axes.

13. A bent, rolled-electrode battery cell as recited in any of examples 9 through 12, wherein at least two of the plurality of electrode rolls are of different sizes in at least one dimension.

14. A bent, rolled-electrode battery cell as recited in any of examples 9 through 13, wherein at least two of the plurality of electrode rolls are of different shapes.

15. A method of fabricating a bent, rolled-electrode battery cell, the method comprising: stacking a first plurality of flat, elongate electrodes with a first flat elongate separator disposed therebetween; bonding a first electrode tab to an end of each electrode of the first plurality of flat, elongate electrodes; rolling the first plurality of flat, elongate electrodes and the first flat insulative separator together about a winding axis of the first electrode roll, with the first electrode tabs bonded to the first plurality of flat, elongate electrodes, to form a first electrode roll; bending the first electrode roll about a first bending axis parallel to the winding axis of the first electrode roll; stacking a second plurality of flat, elongate electrodes with a second flat elongate separator disposed therebetween; bonding a second electrode tab to an end of each electrode of the second plurality of flat, elongate electrodes; rolling the second plurality of flat, elongate electrodes and the second flat insulative separator together about a winding axis of the second electrode roll, with the second electrode tabs bonded to the second plurality of flat, elongate electrodes, to form a second electrode roll; bending the second electrode roll about a second bending axis parallel to the winding axis of the second electrode roll; stacking the first and second electrode rolls along a stacking axis that is perpendicular to the winding axes of the first and second electrode rolls, with the first and second electrode rolls positioned so that their winding axes are substantially parallel to each other; and sealing the stacked first electrode roll and second electrode roll within an enclosure.

16. A method as recited in example 15, wherein the first and second electrode rolls are of different sizes in at least one dimension.

17. A method as recited in example 15 or example 16, wherein the first and second electrode rolls are of different shapes.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A battery cell comprising:
a plurality of electrode rolls, each including a rolled pair of electrodes of opposite polarity, the plurality of electrode rolls being stacked within the battery cell along a stacking axis, each of the plurality of electrode rolls having a separate winding axis around which the electrodes of each of the plurality of electrode rolls have been wound, each said winding axis being perpendicular to the stacking axis, each of the electrodes in each of the plurality of electrode rolls having been formed from a flat conductive sheet that has a plurality of edges that define a length of the electrode and a plurality of ends that define a width of the electrode perpendicular to the edges, wherein each of the plurality of ends are directed in a same direction;
a plurality of electrode tabs, each coupled with and extending from corresponding ends of the electrodes along a winding direction of the electrodes; and
an enclosure containing the plurality of electrode rolls;
wherein the battery cell is bent about a bending axis that is not parallel to an axis along which the plurality of electrode tabs extend from the electrodes.

2. A battery cell as recited in claim 1, wherein each of the plurality of electrode tabs extends from a corresponding electrode roll of the plurality of electrode rolls in a direction that is substantially perpendicular to both the winding axis of the corresponding electrode roll and the stacking axis.

3. A battery cell as recited in claim 1, wherein each of the plurality of electrode rolls is bent about a separate one of a plurality of bending axes that are not parallel to the axis along which the plurality of electrode tabs extend from the electrodes.

4. A battery cell as recited in claim 1, wherein the battery cell is a lithium-ion cell.

5. A battery cell as recited in claim 1, wherein the plurality of electrode rolls, as positioned within the battery cell, are wound in the same direction about their respective winding axes.

6. A battery cell as recited in claim 1, wherein the plurality of electrode rolls, as positioned within the battery cell, are wound in opposite directions about their respective winding axes.

7. A battery cell as recited in claim 1, wherein at least two of the plurality of electrode rolls are of different sizes in at least one dimension.

8. A battery cell as recited in claim 1, wherein at least two of the plurality of electrode rolls are of different shapes.

* * * * *